United States Patent [19]
Van Oorschot et al.

[11] Patent Number: 5,850,443
[45] Date of Patent: *Dec. 15, 1998

[54] KEY MANAGEMENT SYSTEM FOR MIXED-TRUST ENVIRONMENTS

[75] Inventors: Paul C. Van Oorschot, Ottawa; Michael James Wiener, Nepean, both of Canada

[73] Assignee: Entrust Technologies, Ltd., Ottawa, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 698,074

[22] Filed: Aug. 15, 1996

[51] Int. Cl.$^6$ .............................. H04L 9/08; H04L 9/30; H04L 9/00
[52] U.S. Cl. ................................. 380/21; 380/9; 380/30; 380/45; 380/47; 380/49
[58] Field of Search ....................... 380/9, 21, 30, 380/44, 45, 46, 47, 49, 50, 20

[56] References Cited

U.S. PATENT DOCUMENTS

| | | |
|---|---|---|
| 3,962,539 | 6/1976 | Ehrsam et al. . |
| 4,200,770 | 4/1980 | Hellman et al. . |
| 4,405,829 | 9/1983 | Rivest et al. . |
| 4,716,588 | 12/1987 | Thompson et al. ......................... 380/20 |
| 4,882,779 | 11/1989 | Rahtgen . |
| 4,914,697 | 4/1990 | Dabbish et al. ....................... 380/49 X |
| 5,199,069 | 3/1993 | Barrett et al. .......................... 380/21 X |
| 5,222,136 | 6/1993 | Rasmussen et al. . |
| 5,416,841 | 5/1995 | Merrick . |
| 5,511,123 | 4/1996 | Adams ........................................ 380/29 |
| 5,659,618 | 8/1997 | Takahashi . |

OTHER PUBLICATIONS

Secure Hash Standard–FIPS PUB 180–1, U.S. Dept. of Commerce, Technology Administration, National Institute of Standards Technology, Apr. 17, 1995, pp. 1–21.
"A Public Key Cryptosystem and a Signature Scheme Based on Discrete Logarithms", T. ElGamal, IEEE Transactions on Information Theory vol.IT–31, No.4, Jul. 1985, pp. 469–472.

*Primary Examiner*—Bernarr E. Gregory
*Attorney, Agent, or Firm*—Markinson & Reckamp, P.C.

[57] ABSTRACT

The invention allows for transporting, in different degrees of security strength, a symmetric key encrypted using an asymmetric encryption technique, and along with this transporting ciphertext derived from plaintext encrypted under this symmetric key. The encryptor encrypts the plaintext using a symmetric whose strength is commensurate with the trust level of the environment in which the encryptor is located. The encryptor encrypts this symmetric key for one or more intended recipients using an asymmetric technique commensurate with a high-trust environment. In the case of the encryptor residing in the low-trust environment, the encryptor additionally encrypts this symmetric key using an asymmetric encryption public key of the originator itself (or alternatively, that of a third party). Decryption equipment in all environments uses the decryption process corresponding to an algorithm identifier included by the originator. In all cases, the asymmetric encryption/decryption process used for each specific recipient is of a strength commensurate with the trust level of that recipient's own environment.

21 Claims, 4 Drawing Sheets

KEY MANAGEMENT SYSTEM FOR MIXED-TRUST ENVIRONMENTS

FIELD OF INVENTION

The invention resides generally in the field of key management for information security systems. More specifically, the invention relates to key management in communications networks which span environments of varying levels of trust.

BACKGROUND OF INVENTION

Encryption systems consist of an encryption process (or algorithm) and a decryption process. The input to the encryption process is a cryptographic key and data, which is referred to as plaintext data. The input to the decryption process is a cryptographic key and data, which is referred to as ciphertext data. The encryption process converts plaintext into ciphertext, while the decryption process does the converse. One characteristic of the key in an encryption system is its length, here denoted as k bits (a bit is a binary digit, representing a 0 or a 1).

In a symmetric encryption system, data to be protected, called plaintext, is encrypted in one environment to produce ciphertext. The ciphertext is decrypted in a second environment to recover the original plaintext. A number, called a key (or more specifically, a symmetric key) is shared between the encrypting and the decrypting process. The key must be secret, but the ciphertext encrypted under this key can be transmitted over an otherwise unprotected communications medium which is subject to eavesdropping by an adversary. The adversary is unable to recover the plaintext due to lack of knowledge of the key. In well-designed symmetric encryption systems, all k bits of a key are necessary for the encryption and decryption algorithms to function properly. Examples of symmetric encryption algorithms are the Data Encryption Standard (DES), originally detailed by Ehrsam et al. in U.S. Pat. No. 3,962,539; block ciphers constructed using the CAST design technique of Adams, details of which are given in U.S. Pat. No. 5,511,123 Apr. 26, 1996; and well known proprietary block ciphers such as the RC2 cipher of RSA Data Security Inc..

Cryptographic techniques other than encryption also make use of symmetric keys. One example is message authentication code (MAC) algorithms, which involve appending to a transmitted message a tag value (or MAC), which is computed using an algorithm which takes as input the message data and a secret key. The recipient, who shares the secret key, upon receiving the data and tag recomputes its own tag value from the shared key and the received data, and compares this tag value to that received. If the tag values agree, the recipient has some assurance that the data originated from the party with which it shares the key. MACs thus provide data origin authentication.

Symmetric encryption algorithms may be attacked by an adversary who, given one known plaintext-ciphertext pair of data, tries all $2^k$ possible k-bit keys to see which one maps the known plaintext to the known ciphertext. This is referred to as an exhaustive key search. In a well-designed symmetric encryption system, an adversary can do no better than mount such an exhaustive attack. In this case, the bit-length k of the key gives an indication of the strength of the algorithm, the work required for an attack is $2^k$ operations, and the probability of any particular key being guessed, assuming that all keys are equi-probable, is $(\frac{1}{2})^k$.

Asymmetric cryptographic techniques, such as the RSA scheme of Rivest, Shamir and Adleman of U.S. Pat. No. 4,405,829, also play a major role in commercial cryptographic solutions in the field of information security. The basic idea is as follows. An encryption algorithm, for example, is parameterized by a pair of related numbers, known as a private key and a public key. The public key, known to everyone, allows anyone to encrypt data for a specific intended recipient; the private key, known only to the intended recipient, allows only that individual to decrypt the data. Another asymmetric technique, referred to as DH key exchange after Diffie and Hellman, and described by Hellman, Diffie and Merkle in U.S. Pat. No. 4,200,770, allows two parties to establish a shared secret key using only publicly known parameters. DH can also be used for key transfer to provide functionality equivalent to RSA key transfer; this is commonly called ElGamal encryption (see T. ElGamal, "A public key cryptosystem and a signature scheme based on discrete logarithms", IEEE Transactions on Information Theory volume 31, 1985, pages 469–472). Variations of ElGamal encryption have also been proposed and implemented using elliptic curve cryptography.

In practice, asymmetric techniques are often used for key management applications, and in particular, for the transfer of a symmetric key from one party to one or more other parties. Often a different symmetric key is used for each transmission from a party A to a party B; in this case, the symmetric key is referred to as a session key. The session key is then typically used in a symmetric algorithm, e.g. an encryption algorithm such as DES or a CAST algorithm. This is done because symmetric encryption algorithms are often faster for bulk data encryption than asymmetric techniques, while the latter allow for more convenient solutions to the key distribution problem because only the authenticity of a public key need be assured, and this is easier than distributing keys whose secrecy must be guaranteed. Such systems involving both symmetric and asymmetric techniques are called hybrid systems.

A common example of a hybrid technique is to encrypt a data file with a symmetric key to produce ciphertext, and to format this ciphertext as a data file with a header. The header contains one or more copies of the symmetric key, encrypted using the public key of one or more intended recipients. The key asymmetrically encrypted for each recipient is preceded by an identifier which allows the intended recipient to determine which of the possibly multiple fields in the header is the one appropriate for it to decrypt in order to recover the symmetric key. This technique is referred to as digital enveloping.

When cryptographic techniques are used in communications systems which span different (e.g., geographic) regions, in practice it may occur that the different regions can be considered to be trusted to different extents. For example, region X may be considered a high-trust environment because it lies entirely within a country having no concerns about unlawful use of encryption, e.g. because the laws of that country allow law-enforcement access to encryption keys under appropriate circumstances (e.g. wiretaps authorized by one or more judges or other trusted agents). In contrast, a region Y may be considered a low-trust environment because there is some risk that within it, encryption may be used for purposes which subvert law-enforcement or the protection of national security, or because appropriate legislative or administrative safeguards are not in place.

The usual approach (hereafter called the lowest-level approach) to using cryptographic techniques in such mixed-trust environments is to have both a strong and a weak cryptographic technique. Products installed in the low-trust environment are restricted to containing only the weak algorithm, while those in the high-trust environment contain both the strong and weak techniques. By this approach, communications in which both end-points reside in the strong environment may provide security using the strong techniques, whereas for reasons of interoperability, communications in which one or both end-points reside in the low-trust environment can be protected only by the weak techniques. This allows authorities to intercept communications involving the low-trust environment and defeat the cryptographic protection if necessary for national security or law enforcement reasons.

A notable exception to the prior-art lowest-level approach is the mixed-trust encryption system of Ford, specified in the co-pending U.S. patent application Ser. No. 08/535,445 filed on Sep. 28, 1995 now allowed and assigned to the assignee of the present invention. That invention provides a solution to the mixed-trust use of a symmetric encryption algorithm, while the focus of the present invention is key management in a mixed-trust environment, and including mixed-trust key management using asymmetric techniques. The present invention provides a mixed-trust key management solution which is complementary to the invention of application Ser. No. 08/535,445.

The lowest-level approach has at least two drawbacks, which apply for both the case that the cryptographic technique in question is a symmetric encryption algorithm used for bulk encryption as per application Ser. No. 08/535,445 and when an asymmetric cryptographic technique is used for key establishment as per the present invention. The first drawback is that the lowest-level approach unnecessarily degrades the security of the system when communications originating in the high-trust environment are destined for recipients in both the low-trust environment and the high-trust environment (or a low-trust environment alone), because in this case the approach makes the communications susceptible to an adversary capable of defeating the weaker technique. The present invention overcomes this deficiency, while maintaining the objective of guarding against entities in the low-trust environment from using high-trust cryptographic key management techniques for purposes which may subvert law-enforcement or the protection of national security.

The second drawback of the lowest-level approach is that it unnecessarily increases the complexity of products in the high-trust environment, by requiring such products which originate communications from knowing, at the time a communication is originated, whether the intended recipient(s) are in the high-trust environment or the low-trust environment. In some cases, this constraint may even preclude deployment of a product, if the system architecture is unable to make such information available to the originator. The present invention removes this deficiency, such that an originating entity in the high-trust environment performs the same key management process regardless of the trust-level of the environment of the intended recipient(s). Likewise, originating entities in low-trust environments carry out the same operation regardless of the environment of their intended recipient(s). Receiving entities in both high-trust and low-trust environments are able to carry out the appropriate reception operations based on identifying information included by the originator in the transmitted message.

OBJECTS OF INVENTION

It is therefore an object of the present invention to provide a method and a system for establishing shared secret cryptographic keys between two or more parties over a communication network which spans both high-trust and low-trust environments.

It is another objective of the present invention to ensure a secure data transfer which originates in the high-trust environment and for which the intended recipients are either in the high-trust environment or the low-trust environment.

It is another object that entities in the high-trust environment need not carry out any special operations which might otherwise be required to distinguish incoming communications originating other high-trust environment from those which originated in the low-trust environment.

SUMMARY OF INVENTION

Briefly stated according to one aspect the invention is directed to a method of managing cryptographic keys between a first and second parties in communication environments of different degrees of trust. The method comprises steps of the first party encrypting a cryptographic key of a cryptographic strength commensurate with the degree of trust of the environment in which the first party is located, by using a low trust encryption public key of the first party to generate a first party encrypted cryptographic key. The first party separately encrypts the cryptographic key using a high trust encryption public key of the second party to generate a second party encrypted cryptographic key, and concatenates the first and second encrypted cryptographic keys. The method further includes a step of the second party, upon reception of the concatenated data, decrypting the second encrypted cryptographic key to recover the cryptographic key.

According to another aspect, the invention is directed to a method of managing cryptographic keys between a first and second parties in communication environments of different degrees of trust. The method comprises steps of the first party selecting a cryptographic key of a cryptographic strength commensurate with the degree of trust of the environment in which the first party is located and performing a levelling function involving combining, using a reversible function, the cryptographic key with additional data derived in part or in whole from the data field described below, to generate a levelled key. The method further includes steps of the first party encrypting the levelled key using a high trust encryption public key of the second party to generate a second party encrypted levelled key. The method includes a further step of the first party creating a data field consisting in part of the cryptographic key, encrypted under a low trust encryption public key of the first party and concatenating the data field and second party encrypted levelled key. The method yet includes steps of the second party, upon reception of the concatenated data, decrypting the second party encrypted levelled key to recover the levelled key, and performing an unlevelling function, using the received data field and the recovered levelled key to recover the cryptographic key.

DETAILED DESCRIPTION OF PREFERRED EMBODIMENTS OF INVENTION

According to one aspect, the invention resides in a mechanism and supporting system whose design allows for transporting, in different degrees of security strength, a symmetric key encrypted using an asymmetric encryption technique, and optionally along with this transporting ciphertext derived from plaintext encrypted under this symmetric key. The method includes the encryptor encrypting the plaintext using a symmetric encryption process whose strength is commensurate with the trust level of the environment in which the encryptor is located, using a symmetric key of a corresponding strength; using, for transmissions originating in both the low-trust and the high-trust environment, an asymmetric technique commensurate with a high-trust environment to encrypt this symmetric key for one or more intended recipients; and in the case of the encryptor residing in the low-trust environment, additionally encrypting this symmetric key using an asymmetric technique commensurate in strength with the low-trust environment using an asymmetric encryption public key of the originator itself (or alternatively, that of a third party) referred to as key X below. The encryption under key X effectively reduces the overall security to that of the low-trust environment in, and only in, the special case where the originating equipment resides in the low trust environment. Decryption equipment in all environments uses the decryption process corresponding to an algorithm identifier included by the originator. In all cases, the asymmetric encryption/decryption process used for each specific recipient is of a strength commensurate with the trust level of that recipient's own environment. Furthermore, in the case that the originator is in a low-trust environment, the data recovered by asymmetric decryption by the recipient must be combined with a data value which is some function of the ciphertext encrypted under key X in order to recover the symmetric key which allows the recipient to recover the original plaintext. This feature guarantees that the presence of the data field associated with key X cannot be removed in order to, contrary to the design intent, "upgrade" the trust-level of the low-trust equipment, because doing so prevents recipient equipment from recovery of the intended data.

According to another aspect, the invention is directed to an apparatus for complementary cryptographic operations, such as encryption and decryption, in different degrees of security strength. The apparatus comprises either one or both of a first symmetric encryption module for use in encrypting data in high-trust environments which uses a strong cryptographic process, and a second encryption module for use in encrypting data in low-trust environments which uses a less strong symmetric cryptographic process; together with one or both of a first asymmetric encryption/decryption module for use in key transfer providing a security strength commensurate with a high-trust level environment, and a second asymmetric encryption/decryption module for use in key transfer providing a security strength commensurate with a low-trust environment; and finally, also includes a module providing a mechanism capable of determining the source of received cryptographically protected information, allowing a decision to be made to allow proper recovery of an asymmetrically-encrypted symmetric key to allow such key to be used to decrypt symmetrically-encrypted plaintext data.

Figure 1:
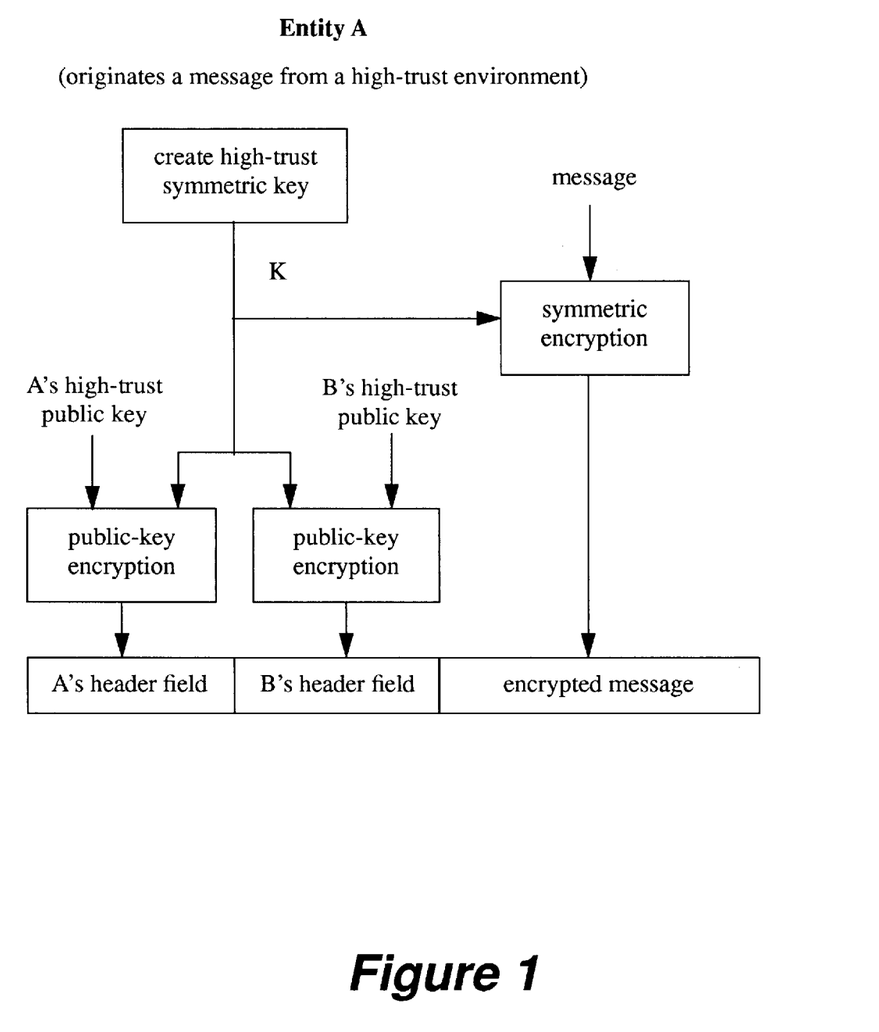
FIGS. 1, 2, 3 and 4 are illustrative examples of algorithmic processes of an encryptor and a decryptor supporting the method according to embodiments of the invention.
Figure 2:
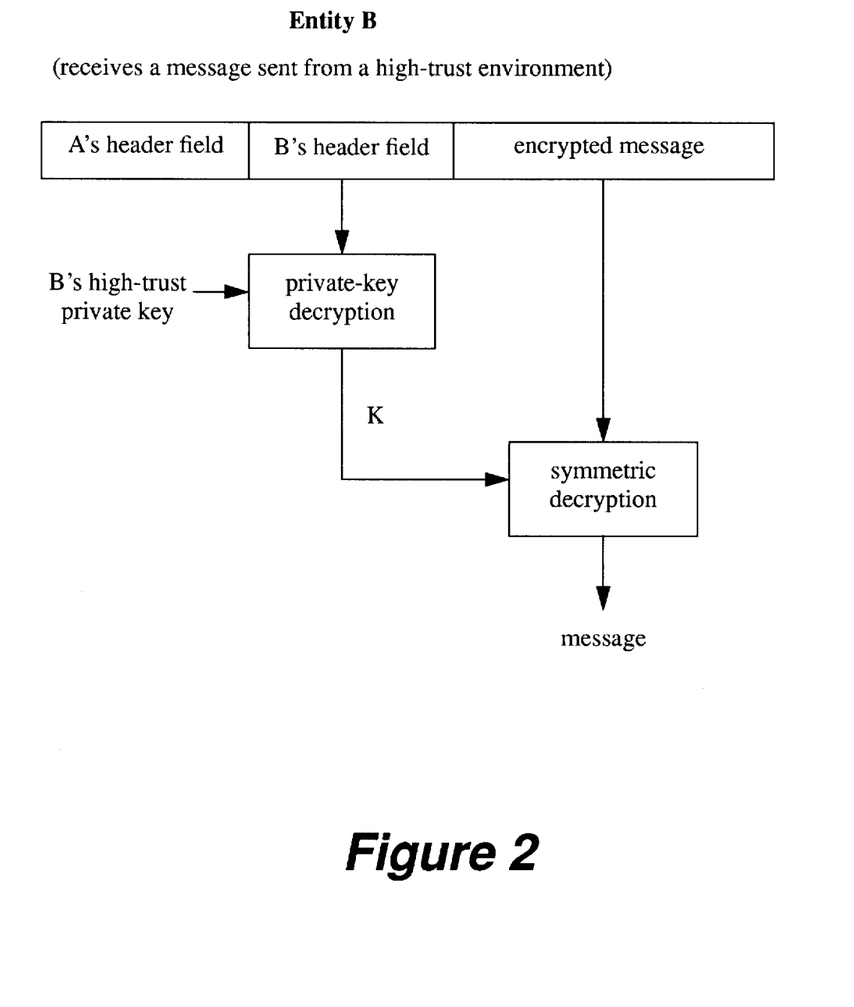

Reference is now made to FIGS. 1 and 2. In one embodiment, the invention involves use of the RSA public-key encryption technique for key transfer from one party to one or more parties over an otherwise unsecured communications channel, and using the digital enveloping technique described above. The plaintext data file is encrypted once, e.g. using the DES or a CAST symmetric algorithm, and a new random symmetric key (referred to below as the file key). The RSA public key of each intended recipient is obtained by the originator using some means which guarantees the authenticity of the key. Each public key is then used to encrypt a separate copy of the file key. The copies of the file key are then included in a file header, followed by one copy of the encrypted data itself.

More specifically, one preferred embodiment of the invention involves the following components. The low-trust system module is constrained to use 512-bit RSA encryption for key transfer, while the high-trust system makes use of 1024-bit RSA for key transfer. Following the invention disclosed in U.S. patent application Ser. No. 08/535,445, the low-trust system is designed to decrypt data files using 80-bit keys, and to encrypt data files using 40-bit keys; this is called an "80/40 export solution". Despite the 512-bit constraint on the low-trust environment, all entities in the communications system have 1024-bit RSA public encryption keys which are made available to other system entities, e.g. through a public directory. Entities which reside in the low-trust environment have, in addition, a 512-bit RSA encryption public key which need not be used by any other entities, and therefore need not appear in the directory; in fact, these 512-bit keys may optionally be generated on a per-use basis for each communication.

If entities A and B are both in a high-trust environment, and A wishes to send a data file to B, A (i.e. the cryptographic module of the equipment which user A is using) symmetrically encrypts the data file using a new 80-bit CAST key K, and then RSA-encrypts one copy of K under its own 1024-bit RSA key, and a second copy of K under the 1024-bit RSA key of B. The two encrypted keys are included in the header of a file which also includes the encrypted data file. The composite file is then sent to B.

In the case that B resides in a low-trust environment, the cryptomodule of entity A generates the same composite file, and sends this to B.

Figure 3:
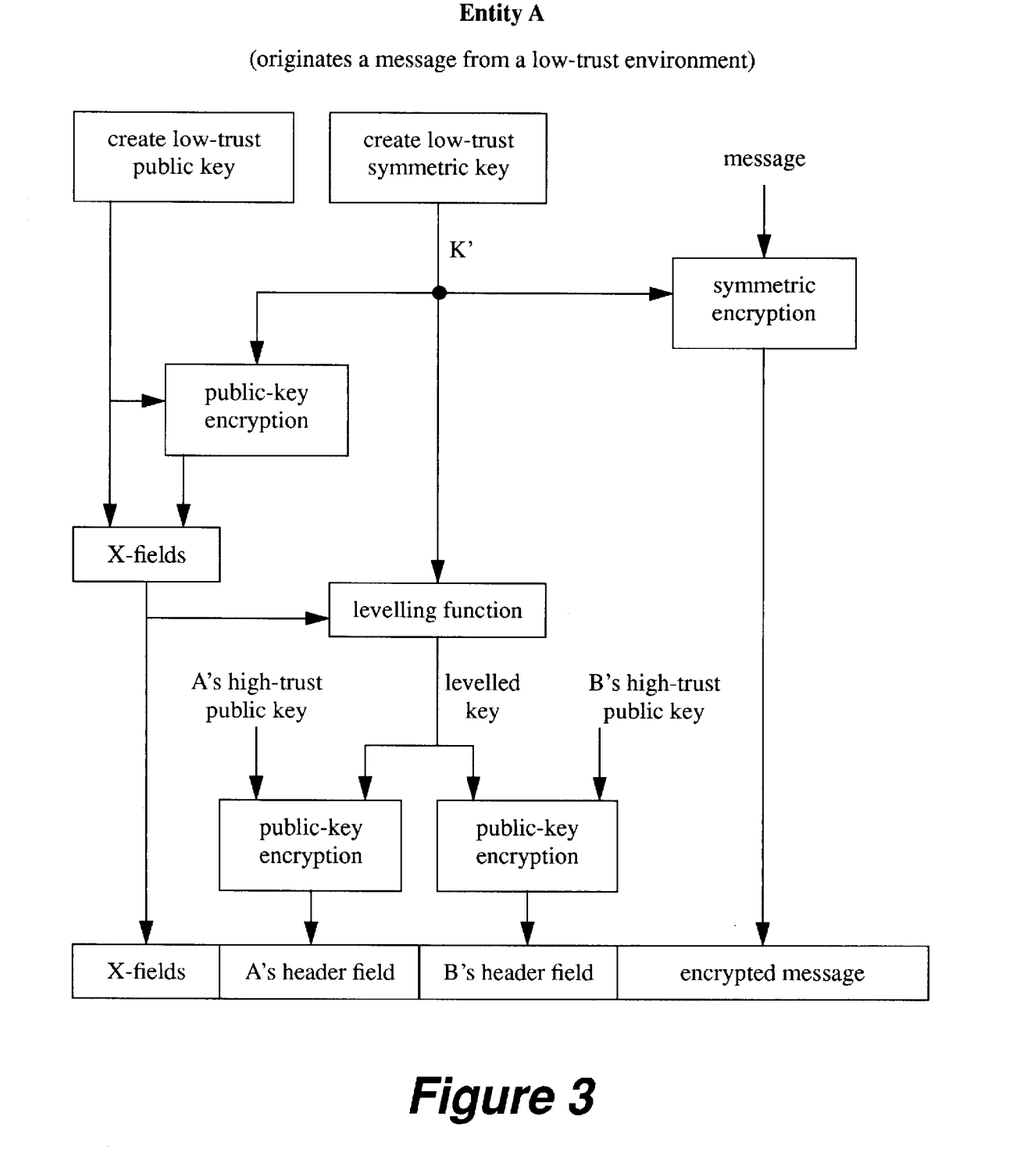
Figure 4:
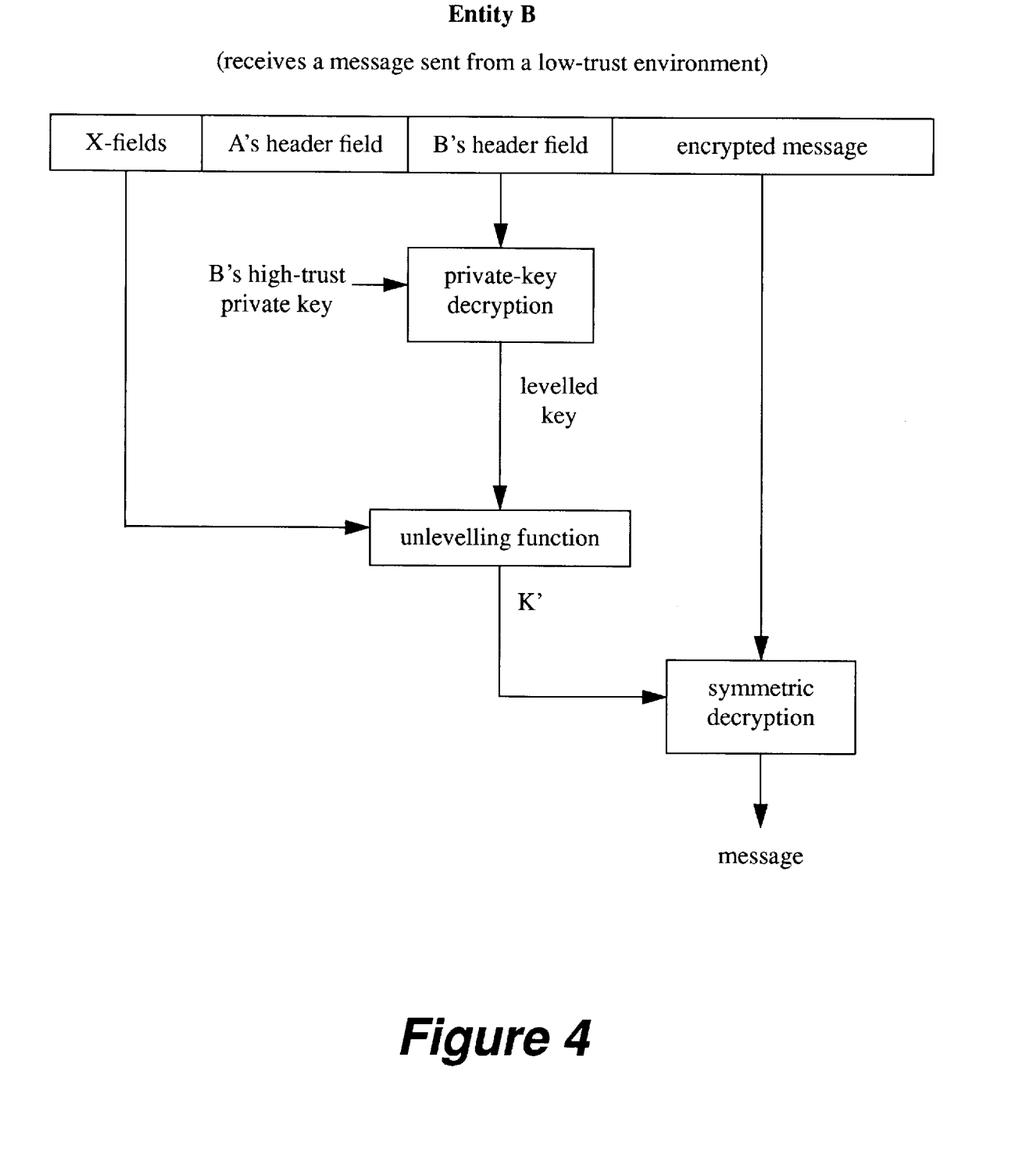

Referring now to FIGS. 3 and 4, in the case that A resides in a low-trust environment, and is communicating with an entity B which resides in either a low-trust environment or a high-trust environment, A's equipment generates the following data instead. A 40-bit CAST key K' is used to symmetrically encrypt the data file, some function of K' (called the levelled key) is RSA-encrypted under each of the 1024-bit keys as above, and two additional data fields are included in the file header. Regarding these additional fields, the first is a 512-bit RSA public key of entity A itself, and the second is the RSA-encryption of K' under this 512-bit key. Let X denote the concatenation of these two data fields, and let h(X) denote the "hash" of the data string X, e.g. using a one-way hash function such as the Secure Hash Algorithm SHA-1 as specified in U.S. Federal Information Processing Standards Publication 180-1 (FIPS PUB 180-1). Alternatively, another well known MD5 hash function or RIPEMD-160 can be used.

The function of K' (the levelled key) which is RSA-encrypted rather than the 80-bit key is (K' XOR h40(X)), where XOR is the bitwise exclusive-OR operation, and h40(X) denotes 40 bits, say the leftmost 40 bits, of the value h(X). The use of the levelled key, rather the K' alone, is one means to ensure that the fields which compose X are not simply removed by a party which wishes to "upgrade" the overall security of the communication to a 1024-bit RSA encryption (as is the case earlier where both A and B resided in the high-trust environment). Thus the following fields are transmitted from A to B in the case that A is in a low-trust environment, and B is either in a low-trust or high-trust environment: X, RSA1024_A(K' XOR h40(X)), RSA1024_B(K' XOR h40(X)), CAST40 (data file). Here K' is a 40-bit symmetric CAST key, CAST40(–) denotes symmetric encryption of the bracketed quantity using a 40-bit symmetric CAST algorithm, and X is the concatenation of: a 512-bit RSA public key of A, and K' RSA-encrypted under this key.

While the described embodiment involves the use of 512-bit and 1024-bit RSA, 40-bit and 80-bit CAST, the particular hash function SHA-1, and a levelled key created by the XOR of two quantities, the invention can clearly be modified for different asymmetric keys lengths and different public-key encryption techniques, different symmetric key lengths and different symmetric key algorithms, different hash functions, and different key-levelling functions. These can all be varied to match different trust level requirements of different environments and systems, and the algorithms preferred for use in different systems.

In the case that entity A in the low trust environment is communicating with both entity B (which uses 1024-bit RSA keys) and some other entity C (which uses 512-bit RSA keys), no special access modifications are made for entity C. The header field for entity C would consist of the 40-bit key K' encrypted with C's 512-bit RSA key. Because entity C uses an RSA key size consistent with a low trust environment, no levelling operations are required. In this way, interoperability is maintained with entities which use low trust RSA key sizes and do not support levelling functionality.

As seen in the above discussion, the present invention provides a method and a system for establishing shared secret keys (e.g. to allow encryption and/or other cryptographic protection including authentication), between two or more parties over a communication network which spans both high-trust and low-trust environments.

The present invention also ensures that cryptographic keys, used for cryptographic protection of data in high-trust environments, are not unnecessarily exposed (i.e. downgraded to a reduced-trust level) to eavesdroppers or adversaries when such keys and the data protected thereunder are transmitted in a key establishment communication and data transfer which originates in the high-trust environment and for which the intended recipients are either in the high-trust environment or the low-trust environment.

The invention provides an apparatus and system design such that equipment in the high-trust environment which is the source of the cryptographically protected information or key transfer, need not know at the time of transfer whether the protected information or key is destined for a high-trust or a low-trust environment.

According to the invention, entities in the high-trust environment, upon receiving cryptographically protected communications from other entities in the high-trust environment, need not carry out any special operations which might otherwise be required to distinguish such incoming communications from those which had originated in the low-trust environment; and that for incoming communications originating in the low-trust environment, the high-trust recipient carries out operations which enforce the requirement that the cryptographic protection used by the low-trust originator was indeed that (and no higher than that) which was designed into the system architecture.

The invention also ensures that persons using equipment incorporating the method and system of the present invention in the low-trust environment are unable to subvert the intended design feature, ensuring that entities be unable to originate messages with cryptographic protection at the same level of security as that provided by the corresponding high-trust environment equipment, and which might therefore subvert the design features supporting law-enforcement actions.

What is claimed is:

1. A method of managing cryptographic keys between first and second parties in communication environments of different degrees of trust comprising the steps of:

the first party
      encrypting a cryptographic key by using a low trust encryption public key of the first party having a first key length, to generate a first party encrypted cryptographic key,
      encrypting the cryptographic key using a higher trust encryption public key of the second party having a second key length longer than the first key length to generate a second party encrypted cryptographic key, and
      concatenating the first party and second party encrypted cryptographic keys, and
   the second party, upon reception of the concatenated data,
      decrypting the second party encrypted cryptographic key to recover the cryptographic key.

2. The method according to claim 1, wherein the cryptographic key is an encryption key, and comprising further steps of:

the first party
      encrypting plaintext into ciphertext using the cryptographic key,
      concatenating the ciphertext to the first party and second party encrypted cryptographic keys,
   the second party
      decrypting the ciphertext into the plaintext using the thus recovered cryptographic key.

3. The method according to claim 2 wherein the cryptographic key is a symmetric encryption key and the first and second parties use a symmetric encryption process for encrypting the plaintext or decrypting the ciphertext.

4. The method according to claim 3 wherein the symmetric encryption process is a block cipher from the group of DES, CAST and RC2.

5. The method according to claim 1 wherein the first and second parties use distinct asymmetric encryption processes to generate the first party and second party encrypted cryptographic keys.

6. The method according to claim 5 wherein the asymmetric encryption processes are any of RSA encryption and ElGamal encryption.

7. The method according to claim 1 wherein there are three or more parties in communication environments of different degrees of trust comprising steps of:

for the third, and other remaining parties separately encrypting the cryptographic key using an encryption public key of each of these parties to generate a second party, third party and additional encrypted cryptographic keys, and
   concatenating the first, second, and additional encrypted cryptographic keys,
   the second and subsequent parties each, upon reception of the concatenated data,
   decrypting the corresponding encrypted cryptographic key to recover the cryptographic key.

8. A method of managing cryptographic keys between first and second parties in communication environments of different degrees of trust comprising the steps of:

the first party selecting a cryptographic key, creating a data field consisting in part of the cryptographic key, encrypted under a low trust encryption public key of the first party having a first key length, combining, using a reversible function, the cryptographic key with additional data derived in part or in whole from the data field to generate a levelled key, encrypting the levelled key using a high trust encryption public key of the second party having a second key length longer than the first key length to generate a second party encrypted levelled key, concatenating the data field, and second party encrypted levelled key, the second party, upon reception of the concatenated data, decrypting the second party encrypted levelled key to recover the levelled key, and recovering the cryptographic key using the received data field and the recovered levelled key.

9. The method according to claim 8, wherein the cryptographic key is an encryption key, and comprising further steps of:

the first party encrypting a plaintext into a ciphertext using the cryptographic key, concatenating the ciphertext to the data field and the second party encrypted levelled key, the second party, upon reception of the concatenated data, decrypting the ciphertext into the plaintext using the thus recovered cryptographic key.

10. The method according to claim 9 wherein the cryptographic key is a symmetric encryption key and the first and second parties use a symmetric encryption process for encrypting the plaintext or decrypting the ciphertext.

11. The method according to claim 10 wherein the symmetric encryption process is a block cipher from the group of DES, CAST and RC2.

12. The method according to claim 8 wherein the first party uses distinct asymmetric encryption processes to generate the second party encrypted levelled key and the second party uses an asymmetric decryption process to decrypt the second party encrytped levelled key.

13. The method according to claim 12 wherein the asymmetric encryption processes are any of RSA encryption, and ElGamal encryption.

14. The method according to claim 8 wherein the step of combining using a reversible process to generate a levelled key comprises further steps of:

encrypting the cryptographic key using the low trust encryption public key of the first party having the first key length, concatenating the resulting data to said low trust encryption public key itself, hashing a resulting data string using a cryptographic hash function, resulting in a hash value, combining a subset of the hash value, using an exclusive-OR operation, with said cryptographic key, to generate the levelled key.

15. The method according to claim 14 where the hash function used is from the group of SHA-1 and MD5, hash functions.

16. The method according to claim 8 wherein there are three or more parties in communication environments of different degrees of trust, comprising steps of:

for third, and other remaining parties separately encrypting the levelled key using an encryption public key of each of these parties to generate a third party and additional encrypted levelled keys, and concatenating the second party, third party, and additional encrypted levelled keys, the second and subsequent parities each, upon reception of the concatenated data, decrypting the corresponding encrypted levelled key, and recovering the corresponding cryptographic key using the decrypted levelled key.

17. The method according to claim 8 wherein the data field consists of a low trust encryption public key of the first party having a key length shorter than a key length of a high trust encryption public key, concatenated to the encrypted value of the cryptographic key under the low trust encryption public key.

18. The method according to claim 8 comprising further steps of the first party encrypting the levelled key by using a high trust encryption public key of the first party having a key length larger than the low trust encryption public key to generate a first party encrypted levelled key, and inserting the first party encrypted levelled key into the concatenated data.

19. An apparatus for complementary cryptographic operations, in different degrees of security strength comprising:

first encryption means for encrypting a cryptographic key by using a low trust encryption public key of the first party having a first key length, to generate a first party encrypted cryptographic key, second encryption means for encrypting the cryptographic key using a higher trust encryption public key of the second party having a second key length longer than the first key length to generate a second party encrypted cryptographic key, and means, responsive to the first and second encryption means, for concatenating the first party and second party encrypted cryptographic keys, and means, responsive to the concatenated data, for decrypting the second party encrypted cryptographic key to recover the cryptographic key.

20. A method of managing cryptographic keys between first and second parties in communication environments of different degrees of trust comprising the steps of:

the first party selecting a cryptographic key, creating a data field consisting in part of the cryptographic key, encrypted under a low trust encryption public key of the first party having a first key length, combining, using a reversible function, the cryptographic key with additional data derived in part or in whole from the data field to generate a levelled key, encrypting the levelled key using a high trust encryption public key of the second party having a second key length longer than the first key length to generate a second party encrypted levelled key, concatenating the data field, and second party encrypted levelled key, the second party, upon reception of the concatenated data, decrypting the second party encrypted levelled key to recover the levelled key, and recovering the cryptographic key using the received data field and the recovered levelled key.

21. An apparatus for complementary cryptographic operations in different degrees of security strength comprising:

first encryption means for encrypting a cryptographic key by using a low trust encryption public key of the first party having a first key length, to generate a first party encrypted cryptographic key, second encryption means for encrypting the cryptographic key using a higher trust encryption public key of the second party having a second key length longer than the first key length to generate a second party encrypted cryptographic key, and means, responsive to the first and second encryption means, for concatenating the first party and second party encrypted cryptographic keys, and means, responsive to the concatenated data, for decrypting the second party encrypted cryptographic key to recover the cryptographic key.

* * * * *